United States Patent [19]

Beeman

[11] Patent Number: 4,771,463
[45] Date of Patent: Sep. 13, 1988

[54] DIGITAL SCRAMBLING WITHOUT ERROR MULTIPLICATION

[75] Inventor: Robert H. Beeman, Scottsdale, Ariz.

[73] Assignee: Siemens Transmission Systems, Inc., Phoenix, Ariz.

[21] Appl. No.: 938,319

[22] Filed: Dec. 5, 1986

[51] Int. Cl.[4] .................................. H04L 9/00
[52] U.S. Cl. ................................. 380/46; 380/48; 380/50
[58] Field of Search ................. 380/46, 50, 48; 364/717; 375/113, 114–116; 370/105, 107

[56] References Cited

U.S. PATENT DOCUMENTS

| | | | |
|---|---|---|---|
| 3,808,536 | 4/1974 | Reynolds | 380/46 |
| 4,165,444 | 8/1979 | Gordon | 380/50 |
| 4,202,051 | 5/1980 | Davida et al. | 380/46 |
| 4,264,781 | 4/1981 | Oosterbaan et al. | 380/46 |
| 4,304,962 | 12/1981 | Fracassi et al. | 380/46 |
| 4,383,322 | 5/1983 | Halpern et al. | 380/46 |
| 4,418,275 | 11/1983 | Oosterbaan et al. | 380/46 |
| 4,639,548 | 1/1987 | Oshima et al. | 380/46 |
| 4,649,419 | 3/1987 | Arragon et al. | 380/46 |
| 4,685,132 | 8/1987 | Bishop et al. | 380/46 |
| 4,689,606 | 8/1987 | Sato | 380/46 |

OTHER PUBLICATIONS

J. E. Savage, "Some Simple Self-Synchronizing Digital Data Scramblers", pp. 449–487.
Scrambling Without Error Multiplication by R. H. Beeman, Presentation and Publication to T1T1.3, Oct. 13, 1986.

*Primary Examiner*—Salvatore Cangialosi
*Attorney, Agent, or Firm*—Jeffrey P. Morris

[57] ABSTRACT

The present invention describes a circuit which allows a data stream to be scrambled by continuously running uninterrupted Pseudo Random sequence without multiplying errors. This is accomplished by allowing a register in the Pseudo Random scrambling receiver to acquire synchronization with a register in the Pseudo Random scrambling transmitter such that the two registers run independently through the same maximal length Pseudo Random sequence without further need for communication with each other. Bit errors occurring between the transmitter and receiver do not cause the scrambling registers at the two ends to become out of synchronization and they remain in synchronism unless a timing slip occurs to cause the transmitter and receiver to lose synchronization. While the present invention is primarily directed toward providing a circuit for performing maximal length Pseudo Random scrambling without error multiplication, the invention is particularly advantageous in reducing the error rate under conditions in which a majority of the error bursts are comprised of one or a small number of error bits such as occurs in transmission loops where impulse noise is a problem.

5 Claims, 3 Drawing Sheets

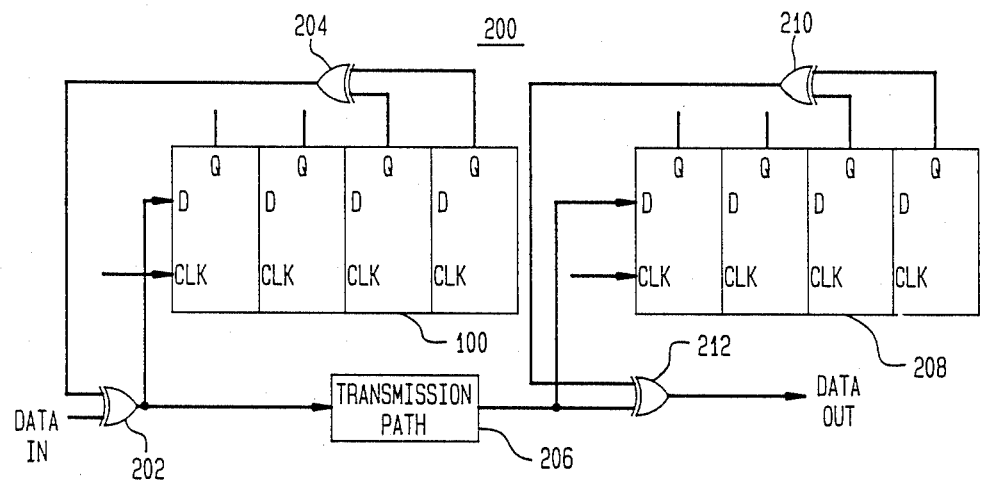
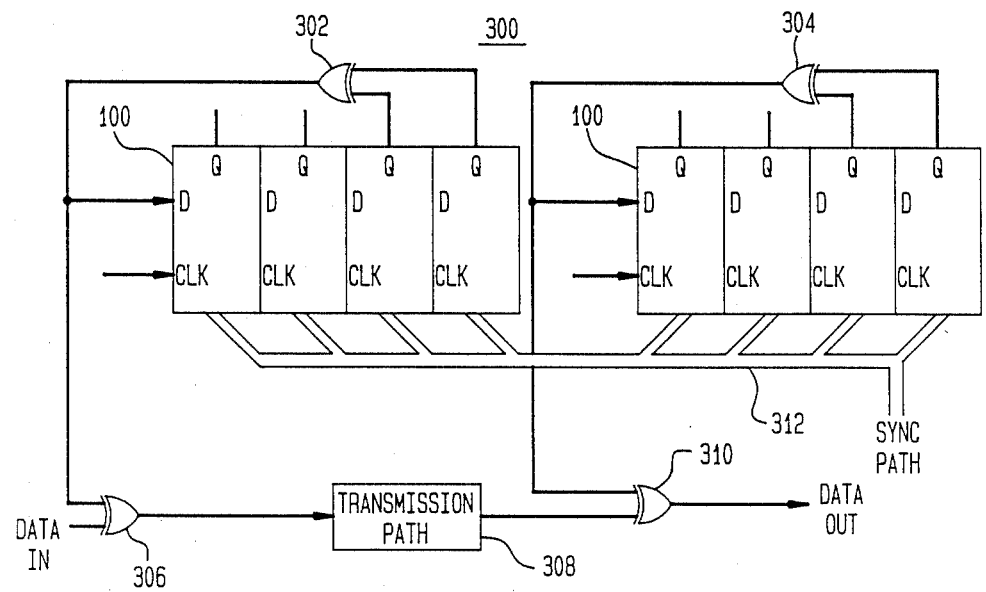
FIG.3

DIGITAL SCRAMBLING WITHOUT ERROR MULTIPLICATION

BACKGROUND OF THE INVENTION

1. Field of the Invention

The present invention relates to communications applications that require the sequence of data bits transmitted over a communication channel to be statistically random. The ISDN Interface is one example of such an application, since proper training and operation of its associated echo canceller requires both a statistically random sequence of bits, and statistical independence (orthogonality) of the transmit and receive data in the two directions of transmission. In order to achieve the required degree of randomness, the data can be "scrambled" using a Maximal Length Pseudo Random sequence. Maximal Length Pseudo Random Sequences are known to have the lowest possible auto-correlation, and are therefore the optimal choice for scrambling.

The present invention is thus useful in digital communication systems where bits must be "scrambled" in order to obtain a statistically random distribution of bits even though the actual input and output bits may be far from random. For exmaple, the input bits at the transmit end of a communication path may be all "zeros", all "ones", or repetitive patterns; however, for best use of the transmission channel the bits actually transmitted must be randomly or pseudo-randomly distributed. At the receive end of the transmission path, the output bits must be restored to their proper values.

2. Description of the Prior Art

Two techniques have been generally used in the prior art to perform the scrambling operation: block scrambling and stream scrambling. Both techniques take advantage of the fact that when a first sequence of bits is exclusive Or'ed with a second sequence of bits and is then again exclusive Or'ed with the second sequence of bits identically aligned, the output is the first sequence just as it was before any exclusive OR operations were performed.

Block scrambling uses a framing pattern or other known means to divide the bits into some definable blocks of information. These bits are then exclusive Or'ed with a fixed pattern of bits synchronized to the boundaries of the block. Since the pattern of scrambling bits is fixed with respect to the block, the same pattern can be used at the receiver end to un-scramble the bits. Any bit error occurring in the transmission channel between the transmitter and receiver will cause an error in that particular bit, but will not cause other bits to be in error, provided only that the receiver remains synchronized with the transmitter as to the block boundaries.

Block scrambling has the disadvantage that the longest framing pattern in a typical communication system is usually shorter than the length of the scrambling pattern needed to assure sufficient "randomness" in the transmitted bits. In addition, the longest framing pattern is not usually equal to the $2^N - 1$ length of the Pseudo-Random pattern desired, so that only part of the pattern is used repetitively, introducing undesirable correlations in the data.

Stream scrambling of the known prior art generally operates on a continuous stream of bits. In a typical implementation the bits at the transmit end of a communication channel to be scrambled are passed through one input of a two input exclusive Or gate. The output of the gate is the output of the scrambler and also the input to an "N" stage shift register. This shift register is tapped at the $N^{th}$ stage and one or more other stages, and the outputs of these taps are exclusive Or'ed together. The result of this exclusive Or operation is applied to the other input of the exclusive Or gate that has the data to be scrambled, as the first input. The tap positions are chosen so that a Galois polynomial represented by the tap weights is irreducible, and if the input data were all zeros and the shift register started out at any state other than all zeros, a Maximal Length Pseudo-Random Shift Register Sequence would be produced.

Stream scrambling of the prior art has the disadvantage that it multiplies transmission errors. When a transmission error occurs, an immediate error is output from the receiver because the input bit was wrong. This wrong bit is also applied to the input of the receive shift register and causes an additional error each time it passes a tap on the register, a minimum of two taps for a Pseudo-Random register. This at least triples the number of bit errors and, when the bit stream consists of several channels multiplexed together, can introduce errors onto channels which would have been error-free but for the error multiplying effect of the scrambler.

At the receiver end the received "scrambled" bits are passed directly into a shift register identical to the shift register at the transmit end. The scrambled bits are also applied to one input of an exclusive Or gate. The receive shift register is tapped identically to the shift register at the transmit end and the taps are exclusive Or'ed together, with the output of the exclusive Or gate of the taps being applied to the second input of the exclusive Or gate which has its first input connected to the received "scrambled" bits.

It is apparent that in the absence of transmission errors, the input to the shift registers at the transmit and receive ends is identical: it is the scrambled data bits. After "N" bits have been transmitted, the contents of the receive shift register are identical with the contents of the transmit shift register and the bits fed back from the taps are the same. Thus the received scrambled data is again exclusive Or'ed with the same pattern of bits from the shift register and is restored to its original "unscrambled" form.

SUMMARY OF THE INVENTION

The present invention describes a circuit which allows a data stream to be scrambled by a continuously running, un-interrupted Pseudo-Random sequence without multiplying errors. This eliminates the problems of the prior art Block Scrambler, which must reset the scrambler at the beginning of each block, degrading the properties of the scrambling sequence. The present invention accomplishes the foregoing by allowing the receiver Pseudo-Random scrambling register to acquire synchronization with the transmitter Pseudo-Random scrambling register so that from then on the two registers run independently through the same Maximal Length Pseudo-Random sequence without further need of communication. Bit errors occuring between the transmitter and receiver do not cause the scrambling registers at the two ends to become different (get out of sync) and they remain in synchronism unless a timing slip occurs to cause the transmitter and receiver to lose synchronism. This event is much rarer than bit errors, and will cause a burst of errors anyway until synchronism is regained.

It is thus a primary object of the present invention to provide a circuit and method for performing Maximal Length Pseudo-Random Scrambling without error multiplication. While the invention will significantly reduce the error rate under any error conditions, it is most advantageous in the error condition in which the majority of the error bursts consist of one or a small number of errored bits, such as occurs on transmission loops where impulse noise is a problem.

It is a further object of the present invention to reduce the transmission error rate approximately by a factor of three (3) on transmission loops with a bit error rate of less than about $10^{-2}$.

The present invention is described with reference to the accompanying drawings and description of a preferred embodiment, wherein:

BRIEF DESCRIPTION OF THE DRAWINGS

FIG. 2 illustrates a typical stream scrambler of the prior art.

FIG. 3 illustrates a non-error multiplying scrambler in accordance with the present invention.

DESCRIPTION OF THE PREFERRED EMBODIMENT

Figure 1:
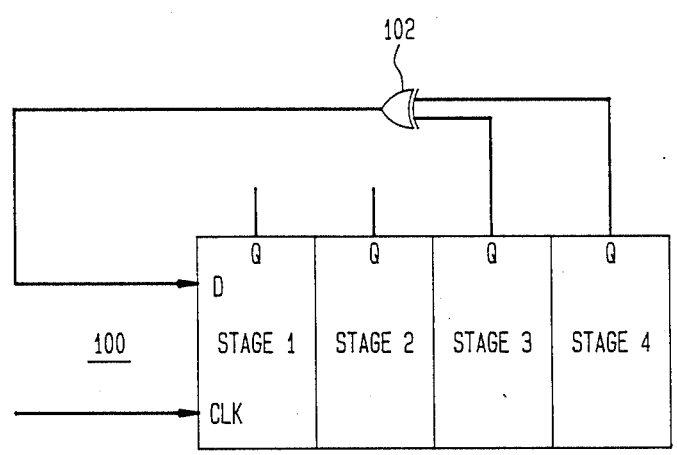
FIG. 1 illustrates a pseudo-random register of the prior art.

Referring to FIG. 1, a typical Pseudo Random Register with data and clock inputs is illustrated at 100. It consists of a shift register with two or more of the "Q" outputs tapped and exclusive Or'ed together, with the resulting bit forming the data input to the first stage. Mathematically, the Pseudo Random Register performs multiplication of Galois Polynomials. The familiar cyclic redundancy check, "CRC" is a Galois division, with the actual value of the CRC bits being the remainder of a division of the data sequence by the CRC Polynomial. Galois arithmetic involves Exclusive Or operations on Boolean Variables, which are variables which have only two values, False or True (0 or 1). In Galois arithmetic, addition and subtraction are equivalent and are the same as an Exclusive Or. One mathematical result of this is that $A+A=0$, and $A+A+A=A$, where A is any Boolean Variable. Multiplication by X is a shift of one unit away from the origin (input) of the register. If a shift register shifts bits to the right, the input to the first stage is $X^0$, which is equal to 1, the "Q" output of the first stage is $X^1$, the "Q" output of the second stage is $X^2$, and so on. Thus the register in FIG. 1 is implementing the Galois Polynomial:

$$X^4+X^3+1$$

This is an irreducible polynomial, which means that it cannot be evenly divided by any lower order Galois Polynomial. Most (but not all) irreducible polynomials are also Maximal Length Polynomials, meaning that a register implementing this polynomial will have the maximum possible period of $2^N-1$, where N is the length of the register. The register shown in FIG. 1 has N=4, giving a period of 15. It is to be understood that one of the $2^N$ possible states does not occur. This forbidden or degenerate state is the "all zeroes" condition, since if all of the bits in the register are zeroes, any possible exclusive Or combination of these bits must also be zero, and the only thing that will ever be fed back into the input is more zeroes, hence the register will be stuck in the degenerate state. Because of this, actual registers must include a "NOR" circuit that applies a logical "one" to the input of the register if the all zeroes state occurs. This circuit (not shown) is included in a practical device to prevet startup problems.

The present invention makes use of the fact that successive states of a maximal length Pseudo-Random shift register are Galois equations in N variables where N is the number of bits in the register. Table 1 is an example based on a 4-bit maximal length register with taps on stages 3 and 4. If the initial state (state 0) of the register is configured with the bits as variables A, B, C, D, the register runs through all 15 possible non-null combinations of the 4 variables, finally returning to the original state. The primary consideration on which the circuitry of the present invention is based is the consideration that any 4 non-identical equations are sufficient to solve for any past or future state of the register. Thus, if it is desired to synchronize the scramblers at the transmit and receive ends it is not necessary to have 4 successive states of one of the register positions (although this would be the simplest configuration to implement). Any 4 independent states is sufficient. This allows, for example, one or more bit(s) of the scrambler sequence to be sent from the transmitter to the receiver each frame or superframe to be stored at the receiver. When N bits have been received, these N bits will be sufficient to solve for the full contents of the register at any defined time relative to the receipt of the bits. Note that the bits sent from the transmitter to the receiver do not have to be consecutive or evenly spaced, but must have a known relationship to each other so that the equations can be solved to implement the decode operation (which consists of combinations of exclusive Or gates) from the bits received to the value of the bits at the desired time. Only two restrictions are necessary:

Spacing of samples received must be such that no two bits represent the same equation (state number).

At least N bits must be received before any decoding can take place.

The following TABLE 1 shows the contents of each register stage 1, 2, 3T and 4T, where "T" indicates that there are two taps on stages 3 and 4. The polynomial for this register is $X^4+X^3+1$. A, B, C and D are Boolean variables. "ABC" represents A exclusive Or B exclusive Or C.

TABLE 1

| STATE # | 1 | 2 | 3 T | 4 T |
|---|---|---|---|---|
| 0 | A | B | C | D |
| 1 | CD | A | B | C |
| 2 | BC | CD | A | B |
| 3 | AB | BC | CD | A |
| 4 | ACD | AB | BC | CD |
| 5 | BD | ACD | AB | BC |
| 6 | AC | BD | ACD | AB |
| 7 | BCD | AC | BD | ACD |
| 8 | ABC | BCD | AC | BD |
| 9 | ABCD | ABC | BCD | AC |
| 10 | ABD | ABCD | ABC | BCD |
| 11 | AD | ABD | ABCD | ABC |
| 12 | D | AD | ABD | ABCD |
| 13 | C | D | AD | ABD |
| 14 | B | C | D | AD |

TABLE 1-continued

| STATE # | 1 | 2 | 3 T | 4 T |
|---|---|---|---|---|
| 15 | A | B | C | D |

The pseudo-random register of FIG. 1 shifts at the bit rate to be scrambled with exclusive Or feedback corresponding to a maximal length polynomial, in this case $X^4+X^3+1$. At the far right tap, at stage 4, the oldest bit corresponds to $X^4$ the next bit to the left is $X^3$, and the $X^0$ or 1 is the feedback of the exclusive Or gate 102 to the input of the shift register 100. Since this is a maximal length register, it will shift through $2^N-1$ states as previously shown in Table 1 and in the following Table 2.

Table 2 shows the contents of the various register states and illustrates the solving for the register 100 contents at state 0 using the contents of Stage 1 from other states. The shift register 100 implements the same polynomial as does the shift register of Table 1, wherein A, B, C and D are Boolean variables and A B C represents A Ex Or B Ex Or C and "1 2 3" represents 1 Ex Or 2 Ex Or 3.

TABLE 2

| STATES | | CONTENTS | VARIABLES | | | |
|---|---|---|---|---|---|---|
| | 1 | CD | A = 1 | 3 | 7 | |
| | 3 | AB | B = 1 | 7 | | |
| | 5 | BD | C = 5 | 7 | | |
| | 7 | BCD | D = 1 | 5 | 7 | |
| Every 2nd State | 2 | BC | A = 2 | 8 | | |
| | 4 | ACD | B = 6 | 8 | | |
| | 6 | AC | C = 2 | 6 | 8 | |
| | 8 | ABC | D = 4 | 6 | | |
| Every 3rd State | 3 | AB | A = 3 | 6 | 9 | 12 |
| | 6 | AC | B = 6 | 9 | 12 | |
| | 9 | ABCD | C = 3 | 9 | 12 | |
| | 12 | D | D = 12 | | | |
| Every 4th State | 4 | ACD | A = 1 | 4 | | |
| | 8 | ABC | B = 4 | 8 | 12 | |
| | 12 | D | C = 1 | 12 | | |
| (note wraparound) | 1 | CD | D = 12 | | | |
| "Random" States | 2 | BC | A = 2 | 7 | 11 | |
| | 3 | AB | B = 2 | 3 | 7 | 11 |
| | 7 | BCD | C = 3 | 7 | 11 | |
| | 11 | AD | D = 2 | 7 | | |

FIG. 2 shows a typpical stream scrambler 200 wherein the Data In is applied to one input of an exclusive Or gate 202 which has its other input supplied by the exclusive Or gate 204 output of a Pseudo Random register 100. The output of the exclusive Or gate 202 at the transmit end is the input to the transmission path 206, which receives data which has been scrambled. At the receive end, the output of the transmission path 206 is applied to the data input of the corresponding receive Pseudo Random register 208. In the absence of transmission errors, the input to the receive register 208 is the same as the input to the Transmit register 100, so after N bits (in this case 4) have been sent, the contents of the two registers will be the same. This causes the output into the scrambling exclusive Or gates 204 and 210 to be the same also, since the same tap configuration samples the same bits from the registers at both transmit and receive ends. Since the exclusive Or operation is its own inverse, the data output via exclusive Or gate 212 from the receiver has been scrambled twice by the same bits, giving the original data sequence back.

When an error occurs, there is an immediate error in the received data because the wrong value was input to the descramblling exclusive Or gate 212 in the receiver. This wrong value was also input to the receive register, and will cause an additional error each time it passes a tap. This is the error multiplication effect. To minimize this effect, Pseudo Random sequences having only 3 terms (2 taps) are almost always chosen for scramblers. This is done to limit the error multiplication factor to 3.

Analysis of the transmit side of the circuit of FIG. 2, reveals that when the Data In is all zeroes, the transmit side of the circuit is a Pseudo Random register, since when the Data In bits are zero the exclusive Or Gate 202 is essentially a non-inverting buffer. When logical ones occur in the data, the bit that would have been applied to the D input of the register is inverted. Mathematically, this is equivalent to adding the Data In to the Pseudo Random sequence and then multiplying by X (by shifting it into the first stage).

In the absence of transmission errors, the input (Transmit) register 100 is the same as the input to the (Receive) Regiter 208 and the contents of the two registers will be identical as soon as 4 bits have been received. Once this happens the input to the exclusive Or gate in the receiver is equal to the input to the exclusive Or gate in the transmitter. Mathematically, if the output of the Pseudo Random registers at a particular bit time is the Boolean variable A then the equation relating Data In and Data Out is:

Data Out=Data In+A+A

Since A+A=0, the equation becomes:

Data Out=Data In+0

Therefore:

Data Out=Data In and the Data is effectively de-scrambled. It is to be understood, however, that if an error occurs in the transmission path an error will occur immediately in the Data Out. Additionaly, the wrong bit will be injected into the receive Pseudo Random register, and will cause another error later as it shifts past each of the taps. Since all Maximal Length polynomials require two or more taps, the error is multiplied by at least 3. This multiplication of errors is the reason why only Polynomials with two factors of X (two taps) are ever used in practical systems. More taps would mean higher multiplication factors for errors, so two taps is the limit in practical scramblers.

FIG. 3 illustrates a non error multiplying scrambler in accordance with the present invention generally at 300. The data does not enter the registers 100, but is scrambled by the sequence applied by the register 100 to the exclusive Or gates 302 and 304 at both the transmit and receive ends respectively. Thus a bit error at the input to the receiver produces only one bit error at the output, since it cannot affect the contents of the register. A block scrambler uses this architecture, with the registers at the receive and transmit ends maintained in synchronism via sync path 312 by the framing or superframing pattern, which resets the registers to some known condition each frame or superframe. Since synchronism is very unlikely to be lost due to bit errors, the block scrambler essentially does not multiply errors. The disadvantage of the block scrambler is, as noted above, that the pattern is reset at the frame or superframe rate and cannot normally complete the full $2^N-1$ pattern. This can introduce undesirable correlations into data patterns and/or fail to break up correlations that already exist. For this reason block scrambling by itself is inadequate for hybrid echo cancellation systems such as ISDN Basic Access "U" Interface. This architecture would be acceptable, however, if the contents of the transmit register could be recovered securely at the receiver in a manner which allows the full $2^N-1$ sequence to cycle repeatedly independently of frame, superframe, or other system periodicities.

As aforementioned, data does not affect the registere 100 operation at either the transmit or receive ends since data is never applied to the input of either register 100.

Mathematically the output of the register 100 at the transmit end is added to the Data In of exclusive Or gate 306 and the same value is added to the scrambled data in the receiver, producing the original data again, just as with the stream scrambler. In this implementation any error in the Transmission Path 308 produces just one error in the Data Out from exclusive Or gate 310 eliminating error multiplication.

Figure 4:
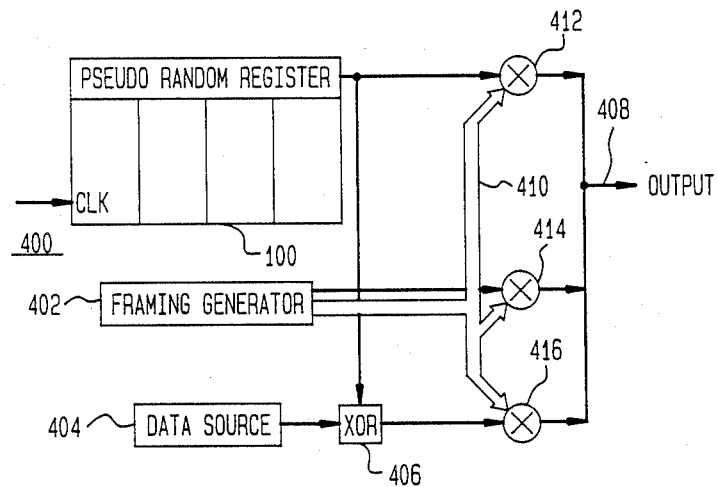
FIG. 4 illustrates a block diagram of a transmitter control circuit for recovery of a pseudo-random code sequence at a receiver.

FIG. 4 illustrates generally at 400 a transmitter architecture which allows recovery of the Pseudo Random coding at the receiver. The transmit Pseudo Random register 100 free runs and occasional bits are gated to the transmission channel by the framing generator 402, which also controls application of framing bits and data bits to the transmission path 408. The data bits from data source 404 are exclusive Or'ed at exclusive Or gate 406 with the Pseudo Random register 100 output before being placed on the transmission path. Thus the information on the transmission path includes periodic samples of the transmit Pseudo Random register that can be used to reconstruct the sequence at the receiver.

Register 100 of FIG. 4 is not synchronized to the frame but is driven by the channel bit clock, and is sampled at one or more known points in the frame or superframe. The control path is illustrated at 410, where the outputs of register 100, framing generator 402 and the data source 404 are multiplexed at 412, 414 and 416 respectively onto the output path.

Figure 5:
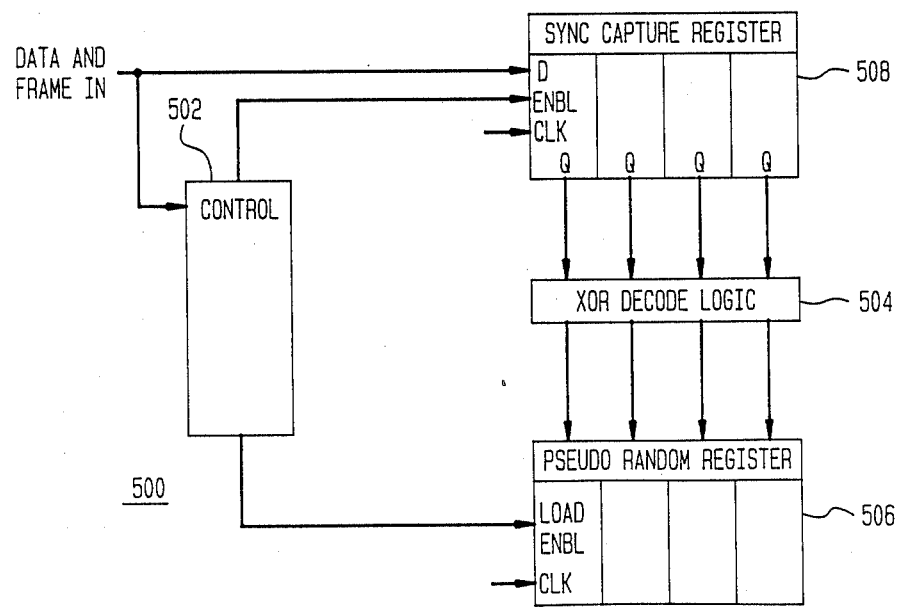
FIG. 5 illustrates a receiver control for synchronizing a receive pseudo-random register with a transmit pseudo-random register.

FIG. 5 shows generally at 500 a circuit at the receiver which is used to synchronize the receive Pseudo Random register 506 with the transmit Pseudo Random register. A control circuit 502 recovers the framing and/or superframing patterns and gates the samples of the transmit Pseudo Random register output into the sync capture register 508. A synchronization path is complete with recovery of normal framing and one bit each frame of the sample for the sync capture register. After N bits have been received, the exclusive Or decode logic 504 will have decoded some future state of the Pseudo Random register 506, using the method discussed previously and shown as a example in Tables 1 and 2. The control circuit 502 executes a parallel load of the receive Pseudo Random register 506 when enough bits have been received. During normal operation the control circuit 502 also monitors the sequence of bits output from the receive Pseudo Random register 506 and compares them with the bits received from the transmit end over the Transmission Path. If more than some predetermined number or percentage of errors is received, the control circuit 502 concludes that the receive Pseudo Random register 506 has fallen out of sync with the transmit Pseudo Random register and after an appropriate number of bits have been received, executes another parallel load to re-initialize the register.

As an alternative embodiment, if at least N bits of scrambling pattern are transmitted each frame or superframe, the sync capture register 508 can be filled immediately and the exclusive Or decode logic simply becomes a wired connection to the pseudo Random register. The connections and number of XOR gates in the XOR decode logic depends on the length and polynomial of the Pseudo Random registers, the exact number and timing of the bits sent from the transmitter, and the number of bits of delay between the last bit into the sync capture register and the parallel load into the Pseudo Random register.

While the present invention has been described in connection with a preferred embodiment thereof, it is to be understood that additional embodiments, modifications, and applications which will become obvious to those skilled in the art are included within the spirit and scope of the invention as set forth by the claims appended hereto.

What is claimed is:

1. A data scrambling circuit for a digital communication system, including:
    first pseudo-random data scrambling shift register means for generating a maximal length pseudo-random data sequence;
    framing generator means for controlling the generation of data framing bits and data bits;
    first exclusive Or circuit means for exclusive Or'ing the data bits with the pseudo-random data sequence and for coupling the output of said exclusive Or circuit means to said transmission path;
    second pseudo-random data scrambling shift register coupled to said transmission path for receiving said maximal length pseudo-random data sequence;
    control means for recovering said framing bits and for obtaining periodic samples of the transmitted data;
    second exclusive Or circuit means for recovering the state of the transmitted pseudo-random data sequence; and
    synchronization capture register means for utilizing said periodic samples to maintain synchronization with the particular data state as recovered by said second exclusive Or means, such that alignment on said sequence is obtained from a plurality of received non-contiguous bits less in number than the pseudo random sequence.

2. A data scrambling circuit in accordance with claim 1, wherein said scrambling register is arranged such that successive states thereof are Galois equations of N variables where N represents the number of data bits in said register.

3. A data scrambling circuit in accordance with claim 1 wherein N equals 4 and wherein said register is comprised of four stages, with taps on stages three and four.

4. a data scrambling circuit in accordance with claim 3 including an additional means for exclusive Or'ing the data sequence on said taps and having an output coupled to one input of said first exclusive Or circuit means.

5. A data scrambling circut for a digital communication system, comprising:
    shift register means for generating a maximal length pseudo-random data sequence;
    means for generating a framing pattern, said framing pattern and said pseudo-random data sequence not being synchronized to each other; and
    means for recovering alignment of said maximal length psuedo-random data sequence from N non-contiguous bits of said sequence, where N is an integer at least equal to the number of stages of said shift register means.

* * * * *